United States Patent
Zhang et al.

(10) Patent No.: US 10,390,117 B2
(45) Date of Patent: Aug. 20, 2019

(54) WORKING CHANNEL (CH) TUNING METHODS, DEVICES AND SYSTEM, OPTICAL NETWORK UNIT (ONU) AND OPTICAL LINE TERMINAL (OLT)

(71) Applicant: ZTE Corporation, Shenzhen (CN)

(72) Inventors: Dezhi Zhang, Shenzhen (CN); Xingang Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 73 days.

(21) Appl. No.: 15/525,129

(22) PCT Filed: Nov. 6, 2015

(86) PCT No.: PCT/CN2015/094031
§ 371 (c)(1),
(2) Date: Jun. 21, 2017

(87) PCT Pub. No.: WO2016/070846
PCT Pub. Date: May 12, 2016

(65) Prior Publication Data
US 2018/0279025 A1    Sep. 27, 2018

(30) Foreign Application Priority Data
Nov. 7, 2014    (CN) .......................... 2014 1 0624175

(51) Int. Cl.
*H04B 10/27*    (2013.01)
*H04Q 11/00*    (2006.01)
(Continued)

(52) U.S. Cl.
CPC ......... *H04Q 11/0067* (2013.01); *H04B 10/27* (2013.01); *H04B 10/272* (2013.01);
(Continued)

(58) Field of Classification Search
CPC ........... H04Q 11/0005; H04Q 11/0062; H04Q 11/0001; H04Q 11/0067; H04Q 11/00;
(Continued)

(56) References Cited

U.S. PATENT DOCUMENTS

2005/0041682 A1* 2/2005 Kramer .............. H04Q 11/0067
                                                     370/458
2008/0089699 A1    4/2008 Li
(Continued)

FOREIGN PATENT DOCUMENTS

| CN | 102870433 A | 1/2013 |
| CN | 103518382 A | 1/2014 |
| JP | 2009194876 A | 8/2009 |
| JP | 5365473 B2 | 12/2013 |

OTHER PUBLICATIONS

International Search Report for corresponding application PCT/CN2015/094031 filed on Nov. 6, 2015; dated Jan. 29, 2016.
(Continued)

*Primary Examiner* — Ted M Wang
(74) *Attorney, Agent, or Firm* — Cantor Colburn LLP

(57) ABSTRACT

Working Channel (CH) tuning methods, devices and system, an Optical Network Unit (ONU) and an Optical Line Terminal (OLT) are provided. In a working CH tuning method, at least one of the following information is provided for an OLT: a working CH corresponding to minimum power consumption or power consumption information corresponding to an ONU in different CHs. A tuning message which indicates an optimal working CH and is provided by the OLT according to the provided information is received from the OLT. A working CH is tuned to the optimal working CH indicated by the tuning message.

17 Claims, 8 Drawing Sheets

At least one of the following information is provided for an OLT: a working CH corresponding to minimum power consumption or power consumption information corresponding to an ONU in different CHs — S302

A tuning message which indicates an optimal working CH and is provided by the OLT according to the provided information is received from the OLT — S304

A working CH is tuned to the optimal working CH indicated by the tuning message — S306

(51) Int. Cl.
*H04B 10/272* (2013.01)
*H04J 14/02* (2006.01)

(52) U.S. Cl.
CPC .......... *H04J 14/0282* (2013.01); *H04Q 11/00* (2013.01); *H04Q 11/0001* (2013.01); *H04Q 11/0005* (2013.01); *H04Q 2011/0015* (2013.01); *H04Q 2011/0016* (2013.01); *H04Q 2011/0079* (2013.01)

(58) Field of Classification Search
CPC ... H04Q 2011/0015; H04Q 2011/0016; H04Q 2011/0079; H04J 14/0212; H04J 14/0227; H04J 14/0282; H04J 14/0062; H04B 10/27; H04B 10/272
See application file for complete search history.

(56) References Cited

U.S. PATENT DOCUMENTS

| | | | | |
|---|---|---|---|---|
| 2011/0255866 A1* | 10/2011 | Van Veen | ......... | H04B 10/07955 398/35 |
| 2016/0099792 A1* | 4/2016 | Gao | .................... | H04J 14/0257 398/69 |

OTHER PUBLICATIONS

European Search Report for corresponding application EP 15857048; dated Oct. 5, 2017.

* cited by examiner

WORKING CHANNEL (CH) TUNING METHODS, DEVICES AND SYSTEM, OPTICAL NETWORK UNIT (ONU) AND OPTICAL LINE TERMINAL (OLT)

TECHNICAL FIELD

The present disclosure relates to the field of communication, and more particularly to a working CH tuning methods, devices and system, an ONU and an OLT.

BACKGROUND

Along with development of a network technology, massive services such as voices, data and videos may be transmitted by virtue of a network, thus a requirement on a bandwidth of the network increases, and a Passive Optical Network (PON) emerges to meet such a requirement. FIG. 1 is a topological structure diagram of a PON system according to a related PON technology. As shown in FIG. 1, the PON system is usually formed by an OLT at a network side, ONUs at a user side and an Optical Distribution Network (ODN), and usually adopts a point-to-multipoint network structure. The ODN is formed by single-mode optical fibers and passive optical devices such as an optical splitter and an optical connector, and provides an optical transmission medium for physical connections between the OLT and the ONUs. In order to further improve a bandwidth of a network, a PON system in which multiple paths of wavelengths are transmitted in a trunk optical fiber and each path of wavelength is accessed by virtue of a time division technology is provided, and this type of PON system is called as a Time Wavelength Division Multiplexing (TWDM) PON system.

FIG. 2 is a topological structure diagram of a TWDM PON system according to a related PON technology. As shown in FIG. 2, there are multiple TWDM Channel Terminations (CTs) in a TWDM PON OLT, and each TWDM CT processes a pair of uplink and downlink wavelength CHs (forming a TWDM CH) which are associated with each other, and provides access and maintenance service for all ONUs working in the pair of wavelength CHs. The ONUs transmit data in the pair of wavelength CHs in a time division multiplexing manner. The uplink and downlink wavelength CHs processed by different TWDM CTs are different. Each ONU may send uplink data in a specific uplink timeslot according to an instruction of the corresponding OLT CT.

For implementing load balancing, energy saving, ONU library type reduction and the like, ONUs in a TWDM PON system are colorless, that is, T-Txs and T-Rxs of all the ONUs have the same physical structures, and the T-Txs and T-Rxs of the ONUs are set to be tunable. The ONUs may tune working wavelengths of the T-Txs and the T-Rxs, thereby being able to work in uplink and downlink wavelength CHs of any OLT CT.

However, an ONU has different power consumption when working in different OLT CTs, and enabling the ONU to work in any OLT CT may not effectively reduce the power consumption of the ONU.

SUMMARY

Some embodiments of the present disclosure provide working CH tuning methods, devices and system, an ONU and an OLT, so as to at least solve the problem in the related technology that an ONU has different power consumption when working in different OLT CTs, and enabling the ONU to work in any OLT CT may not effectively reduce the power consumption of the ONU.

According to an embodiment of the present disclosure, a working CH tuning method is provided, which may include the following acts. At least one of the following information is provided for an OLT: a working CH corresponding to minimum power consumption or power consumption information corresponding to an ONU in different CHs. A tuning message which indicates an optimal working CH and is provided by the OLT according to the provided information is received from the OLT. A working CH is tuned to the optimal working CH indicated by the tuning message.

In an exemplary embodiment, the working CH corresponding to the minimum power consumption may include a working CH corresponding to minimum power consumption of the ONU under a current environment parameter; and/or the power consumption information corresponding to the ONU in different CHs may include power consumption information corresponding to the ONU in different CHs under a current environment parameter.

In an exemplary embodiment, the power consumption information corresponding to the ONU in different CHs may include at least one of: power consumption values corresponding to the ONU in different CHs or a power consumption ranking table corresponding to the ONU in different CHs.

In an exemplary embodiment, the information may be provided for the OLT in a following manner. Under a condition that the ONU is under a registration activation response process, the information is provided for the OLT through a Serial_Number_ONU response message responsive to registration activation. Under a condition that the ONU is in a working state, the information is provided for the OLT through at least one of: a Serial_Number_ONU working message, a Physical Layer Operation Administration and Maintenance (PLOAM) message or an ONU Management Control Interface (OMCI) message.

In an exemplary embodiment, before the act that the information is provided for the OLT, the method may further include the following acts. The power consumption information corresponding to the ONU in different CHs is acquired in at least one of the following manners: the power consumption information corresponding to the ONU in different CHs is evaluated according to a current environment parameter of the ONU; or the power consumption information of the ONU working in different CHs under a current environment parameter is read.

According to another embodiment of the present disclosure, a working CH tuning method is provided, which may include the following acts. Power consumption information corresponding to an ONU in different CHs is acquired. A working CH corresponding to minimum power consumption is selected for activation.

In an exemplary embodiment, the power consumption information corresponding to the ONU in different CHs may include power consumption information of the ONU in different CHs under a current environment parameter.

In an exemplary embodiment, the power consumption information corresponding to the ONU in different CHs may include at least one of: power consumption values corresponding to the ONU in different CHs or a power consumption ranking table corresponding to the ONU in different CHs.

In an exemplary embodiment, the power consumption information corresponding to the ONU in different CHs may be acquired in at least one of the following manners: the power consumption information corresponding to the ONU in different CHs is evaluated according to a current environment parameter of the ONU; or the power consumption information of the ONU working in different CHs under a current environment parameter is read.

According to another embodiment of the present disclosure, a working CH tuning method is provided, which may include the following acts. At least one of the following information provided by an ONU is received: a working CH corresponding to minimum power consumption or power consumption information corresponding to the ONU in different CHs. An optimal working CH of the ONU is determined according to the information provided by the ONU. A tuning message for indicating to tune a working channel to the optimal working CH is sent to the ONU.

In an exemplary embodiment, the working CH corresponding to the minimum power consumption may include a working CH corresponding to minimum power consumption of the ONU under a current environment parameter; and/or the power consumption information corresponding to the ONU in different CHs may include power consumption information corresponding to the ONU in different CHs under a current environment parameter.

In an exemplary embodiment, the power consumption information corresponding to the ONU in different CHs may include at least one of: power consumption values corresponding to the ONU in different CHs or a power consumption ranking table corresponding to the ONU in different CHs.

In an exemplary embodiment, the information provided by the ONU may be received in at least one of the following manners: the information provided by the ONU is received in a report from the ONU; the information provided by the ONU is received after a query is sent to the ONU by an OLT; or the information provided by the ONU is received in a manner of reading by the OLT.

In an exemplary embodiment, the act that the optimal working CH of the ONU is determined may include at least one of the following acts. The optimal working CH is determined to be the working CH corresponding to the minimum power consumption of the ONU. Or, the optimal working CH is determined to be a working CH determined based on the power consumption information in different working CHs and a management factor. The management factor may include at least one of: numbers of ONUs corresponding to different CHs, ONU bandwidth distributions of different CHs, time delays of different CHs after joining of the ONU or a working state of an OLT port.

In an exemplary embodiment, under a condition that the management factor includes at least one of the ONU bandwidth distributions of different CHs or the time delays of different CHs after joining of the ONU, the act that the optimal working CH is determined to be the working CH determined based on the power consumption information in different working CHs and the management factor may include the following acts. A working CH corresponding to minimum power consumption is determined according to the power consumption information in different working CHs. Whether a bandwidth resource of the working CH corresponding to the minimum power consumption meets access of the ONU or not and/or whether the time delay of the working CH corresponding to the minimum power consumption after access of the ONU is smaller than a predetermined time length or not is judged. Under a condition that a judgment result is positive, the working CH corresponding to the minimum power consumption is determined as the optimal working CH, and/or under a condition that the judgment result is negative, the act of judging whether a bandwidth resource of a corresponding working CH meets access of the ONU or not and/or whether the time delay of the corresponding working CH after access of the ONU is smaller than the predetermined time length or not is repeatedly executed according to a sequence from low to high power consumption values until a judgment result is positive, and then the corresponding working CH is determined as the optimal working CH.

According to another embodiment of the present disclosure, a working CH tuning method is provided, which may include the following acts. An ONU acquires power consumption information in different working CHs. An OLT acquires the power consumption information in different working CHs from the ONU. The OLT determines an optimal working CH of the ONU according to the power consumption information. The OLT sends an indication message for indicating the ONU to tune a working CH to the optimal working CH to the ONU. The ONU tunes the working CH to the optimal working CH according to the indication message.

In an exemplary embodiment, the power consumption information corresponding to the ONU in different CHs may include power consumption information corresponding to the ONU in different CHs under a current environment parameter.

In an exemplary embodiment, the power consumption information corresponding to the ONU in different CHs may include at least one of: power consumption values corresponding to the ONU in different CHs or a power consumption ranking table corresponding to the ONU in different CHs.

In an exemplary embodiment, the ONU may acquire the power consumption information in different working CHs in at least one of the following manners: the power consumption information corresponding to the ONU in different CHs is evaluated according to a current environment parameter of the ONU; or the power consumption information of the ONU working in different CHs under a current environment parameter is read.

In an exemplary embodiment, the act that the OLT determines the optimal working CH of the ONU according to the power consumption information may include at least one of the following acts. The OLT determines the optimal working CH of the ONU according to power consumption values and/or a power consumption ranking table corresponding to the power consumption information. Or, the OLT determines the optimal working CH according to power consumption values and/or a power consumption ranking table corresponding to the power consumption information as well as a management factor. The management factor may include: numbers of ONUs corresponding to different CHs, ONU bandwidth distributions of different CHs, time delays of different CHs after joining of the ONU or a working state of an OLT port.

In an exemplary embodiment, under a condition that the management factor includes at least one of the ONU bandwidth distributions of different CHs or the time delays of different CHs after joining of the ONU, the optimal working CH may be determined according to the power consumption values and/or power consumption ranking table corresponding to the power consumption information as well as the management factor in a following manner. A working CH corresponding to minimum power consumption is determined according to the power consumption information in different working CHs. Whether a bandwidth resource of the working CH corresponding to the minimum power consumption meets access of the ONU or not and/or whether the time delay of the working CH corresponding to the minimum power consumption after access of the ONU is smaller than a predetermined time length or not is judged. Under a condition that a judgment result is positive, the working CH corresponding to the minimum power consumption is determined as the optimal working CH, and/or under a condition that the judgment result is negative, the act of judging whether a bandwidth resource of a corresponding working CH meets access of the ONU or not and/or whether the time delay of the corresponding working CH after access of the ONU is smaller than the predetermined time length or not is repeatedly executed according to a sequence from low to high power consumption values until a judgment result is positive, and then the corresponding working CH is determined as the optimal working CH.

According to another embodiment of the present disclosure, a working CH tuning device is provided, which may include: a provision module, arranged to provide, for an OLT, at least one of the following information: a working CH corresponding to minimum power consumption or power consumption information corresponding to an ONU in different CHs; a first receiving module, arranged to receive a tuning message which indicates an optimal working CH and is provided by the OLT according to the provided information; and a tuning module, arranged to tune a working CH to the optimal working CH indicated by the tuning message.

In an exemplary embodiment, the provision module may be further arranged to provide the information for the OLT in a following manner. Under a condition that the ONU is under a registration activation response process, the information is provided for the OLT through a Serial_Number_ONU response message responsive to registration activation. Under a condition that the ONU is in a working state, the information is provided for the OLT through at least one of: a Serial_Number_ONU working message, a PLOAM message or an OMCI message.

In an exemplary embodiment, the device may further include a first acquisition module, arranged to acquire the power consumption information corresponding to the ONU in different CHs in at least one of the following manners: the power consumption information corresponding to the ONU in different CHs is evaluated according to a current environment parameter of the ONU; and the power consumption information of the ONU working in different CHs under a current environment parameter is read.

According to another embodiment of the present disclosure, a working CH tuning device is provided, which may include: a second acquisition module, arranged to acquire power consumption information corresponding to an ONU in different CHs; and a selection module, arranged to select a working CH corresponding to minimum power consumption for activation.

In an exemplary embodiment, the second acquisition module may be further arranged to acquire the power consumption information corresponding to the ONU in different CHs in at least one of the following manners: the power consumption information corresponding to the ONU in different CHs is evaluated according to a current environment parameter of the ONU; or the power consumption information of the ONU working in different CHs under a current environment parameter is read.

According to another embodiment of the present disclosure, an ONU is provided, which may include any above-mentioned device.

According to another embodiment of the present disclosure, a working CH tuning device is provided, which may include: a second receiving module, arranged to receive at least one of the following information provided by an ONU: a working CH corresponding to minimum power consumption or power consumption information corresponding to the ONU in different CHs; a determination module, arranged to determine an optimal working CH of the ONU according to the information provided by the ONU; and a sending module, arranged to send a tuning message for indicating to tune a working channel to the optimal working CH to the ONU.

In an exemplary embodiment, the second receiving module may be further arranged to receive the information provided by the ONU in at least one of the following manners: the information provided by the ONU is received in a report from the ONU; the information provided by the ONU is received after a query is sent to the ONU by an OLT; or the information provided by the ONU is received in a manner of reading by the OLT.

In an exemplary embodiment, the determination module may include at least one of: a first determination unit, arranged to determine the optimal working CH to be the working CH corresponding to the minimum power consumption of the ONU; and a second determination unit, arranged to determine the optimal working CH to be a working CH determined based on the power consumption information in different working CHs and a management factor. The management factor may include at least one of: numbers of ONUs corresponding to different CHs, ONU bandwidth distributions of different CHs, time delays of different CHs after joining of the ONU or a working state of an OLT port.

In an exemplary embodiment, the second determination unit may include: a determination subunit, arranged to, under a condition that the management factor includes at least one of the ONU bandwidth distributions of different CHs or the time delays of different CHs after joining of the ONU, determine a working CH corresponding to minimum power consumption according to the power consumption information in different working CHs; a judgment subunit, arranged to judge whether a bandwidth resource of the working CH corresponding to the minimum power consumption meets access of the ONU or not and/or whether the time delay of the working CH corresponding to the minimum power consumption after access of the ONU is smaller than a predetermined time length or not; and a processing subunit, arranged to, under a condition that a judgment result is positive, determine a working CH corresponding to minimum power consumption is determined as the optimal working CH, and/or under a condition that the judgment result is negative, repeatedly execute the act of judging whether a bandwidth resource of a corresponding working CH meets access of the ONU or not and/or whether the time delay of the corresponding working CH after access of the ONU is smaller than the predetermined time length or not according to a sequence from low to high power consumption values until a judgment result is positive, and then determine the corresponding working CH as the optimal working CH.

According to another embodiment of the present disclosure, an OLT is provided, which may include any above-mentioned device.

According to another embodiment of the present disclosure, a working CH tuning system is provided, which may include: an ONU and an OLT. The ONU may be arranged to acquire power consumption information in different working CHs. The OLT may be arranged to acquire the power consumption information in different working CHs from the ONU. The OLT may be arranged to determine an optimal working CH of the ONU according to the power consumption information, and send an indication message for indicating the ONU to tune a working CH to the optimal working CH to the ONU. The ONU may be arranged to tune the working CH to the optimal working CH according to the indication message.

In an exemplary embodiment, the ONU may be further arranged to acquire the power consumption information in different working CHs in at least one of the following manners: the power consumption information corresponding to the ONU in different CHs is evaluated according to a current environment parameter of the ONU; or the power consumption information of the ONU working in different CHs under a current environment parameter is read.

In an exemplary embodiment, the OLT may be further arranged to determine the optimal working CH of the ONU according to power consumption values and/or a power consumption ranking table corresponding to the power consumption information; or the OLT may be further arranged to determine the optimal working CH according to power consumption values and/or a power consumption ranking table corresponding to the power consumption information as well as a management factor. The management factor may include: numbers of ONUs corresponding to different CHs, ONU bandwidth distributions of different CHs, time delays of different CHs after joining of the ONU or a working state of an OLT port.

In an exemplary embodiment, the OLT may be further arranged to, under a condition that the management factor includes at least one of the ONU bandwidth distributions of different CHs or the time delays of different CHs after joining of the ONU, determine the optimal working CH according to power consumption values and/or a power consumption ranking table corresponding to the power consumption information as well as the management factor in a following manner. The working CH corresponding to minimum power consumption is determined according to the power consumption information in different working CHs. Whether a bandwidth resource of the working CH corresponding to the minimum power consumption meets access of the ONU or not and/or whether the time delay of the working CH corresponding to the minimum power consumption after access of the ONU is smaller than a predetermined time length or not is judged. Under a condition that a judgment result is positive, the working CH corresponding to the minimum power consumption is determined as the optimal working CH, and/or under a condition that the judgment result is negative, the act of judging whether a bandwidth resource of a corresponding working CH meets access of the ONU or not and/or whether the time delay of the corresponding working CH after access of the ONU is smaller than the predetermined time length or not is repeatedly executed according to a sequence from low to high power consumption values until a judgment result is positive, and then the corresponding working CH is determined as the optimal working CH.

According to embodiments of the present disclosure, at least one of the following information is provided for an OLT: a working CH corresponding to minimum power consumption, or power consumption information corresponding to an ONU in different CHs. A tuning message which indicates an optimal working CH and is provided by the OLT according to the provided information is received from the OLT. A working CH is tuned to the optimal working CH indicated by the tuning message. The problem in the related technology that an ONU has different power consumption when working in different OLT CTs, and enabling the ONU to work in any OLT CT may not effectively reduce the power consumption of the ONU is solved, and an effect of effectively reducing the power consumption of the ONU may be further achieved.

BRIEF DESCRIPTION OF THE DRAWINGS

The drawings described here are adopted to provide a further understanding to the present disclosure, and form a part of the present disclosure. Schematic embodiments of the present disclosure and descriptions thereof are adopted to explain the present disclosure and not intended to form limits to the present disclosure. In the drawings.

DETAILED DESCRIPTION OF THE EMBODIMENTS

The present disclosure will be described below in detail with reference to the drawings and embodiments. It may be appreciated that the embodiments in the present disclosure and characteristics in the embodiments may be combined under the condition of no conflicts.

Figure 1:
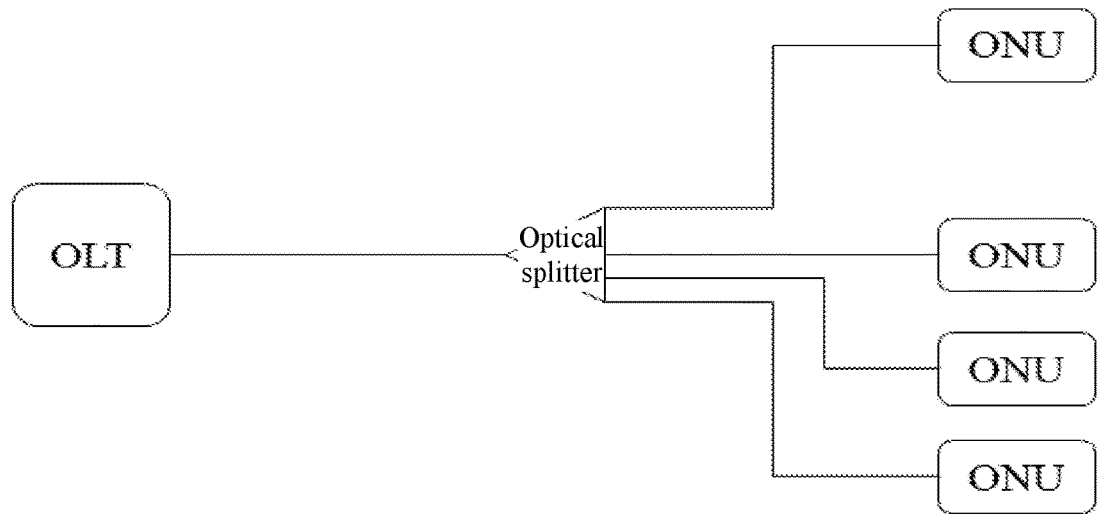
FIG. 1 is a topological structure diagram of a PON system according to the related technology.
Figure 2:
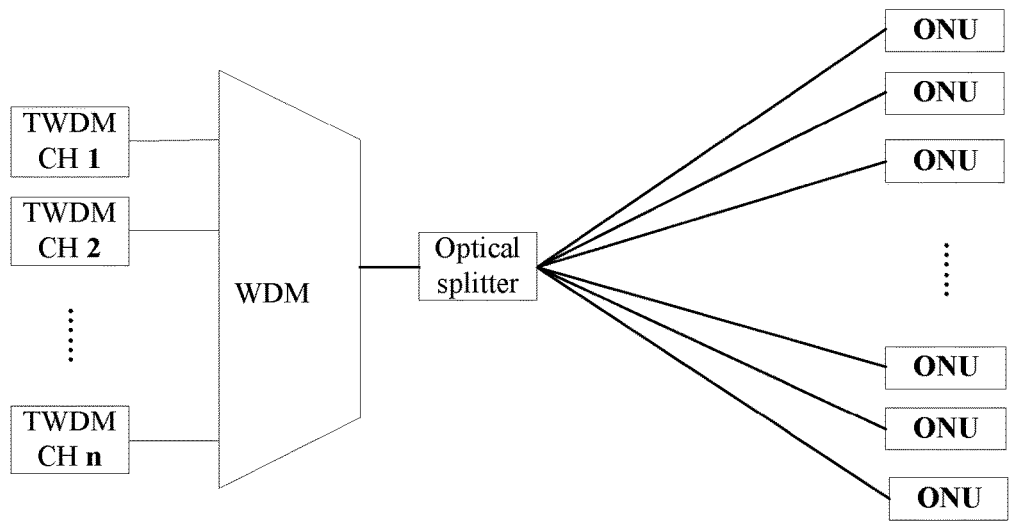
FIG. 2 is a topological structure diagram of a TWDM PON system according to the related technology.
Figure 3:
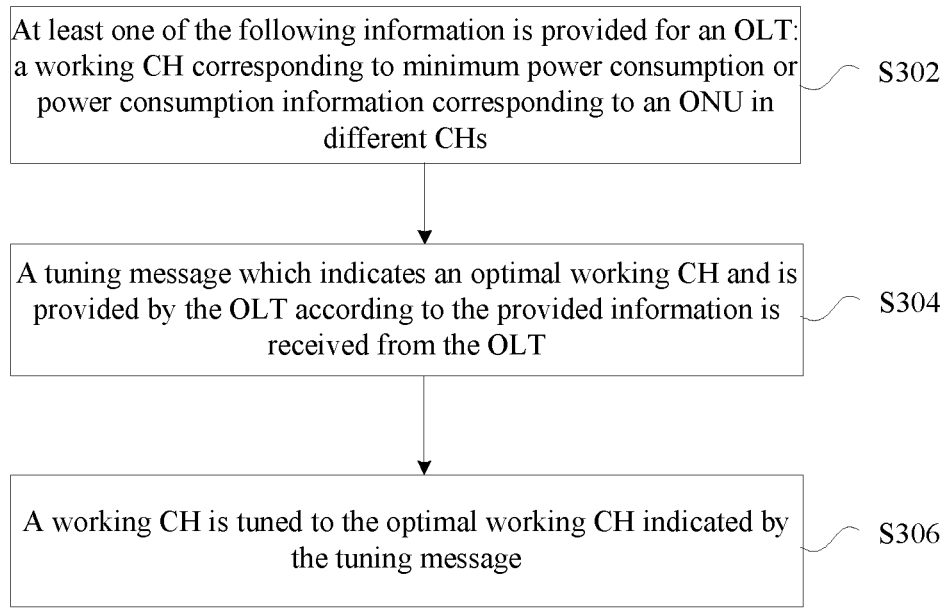
FIG. 3 is a flowchart of a first working CH tuning method according to an embodiment of the present disclosure.

An embodiment provides a working CH tuning method. FIG. 3 is a flowchart of a first working CH tuning method according to an embodiment of the present disclosure. As shown in FIG. 3, the flow may include the following acts S302 to S306.

At act S302, at least one of the following information is provided for an OLT: a working CH corresponding to minimum power consumption or power consumption information corresponding to an ONU in different CHs. The working CH corresponding to the minimum power consumption may include a working CH corresponding to minimum power consumption of the ONU under a current environment parameter. The power consumption information corresponding to the ONU in different CHs may include power consumption information corresponding to the ONU in different CHs under a current environment parameter. It may be appreciated that the ONU may correspond to multiple kinds of power consumption information in different CHs, for example, including at least one of: power consumption values corresponding to the ONU in different CHs or a power consumption ranking table corresponding to the ONU in different CHs.

At act S304, a tuning message which indicates an optimal working CH and is provided by the OLT according to the provided information is received from the OLT.

At act S306, a working CH is tuned to the optimal working CH indicated by the tuning message.

By the acts, a tuning message which indicates an optimal working CH and is provided by the OLT according to the provided information is received from the OLT, and the working CH is tuned to the optimal working CH indicated by the tuning message, so that the problem in the related technology that an ONU has different power consumption when working in different OLT CTs, and enabling the ONU to work in any OLT CT may not effectively reduce the power consumption of the ONU is solved, and an effect of effectively reducing the power consumption of the ONU may be further achieved.

Multiple manners may be adopted to provide the information for the OLT. For example, the following manner may be adopted. Under a condition that the ONU is under a registration activation response process, the information is provided for the OLT through a Serial_Number_ONU response message responsive to registration activation. Under a condition that the ONU is in a working state, the information is provided for the OLT through at least one of: a Serial_Number_ONU working message, a PLOAM message or an OMCI message.

In an exemplary embodiment, before the act that the information is provided for the OLT, the method may further include the following act. The power consumption information corresponding to the ONU in different CHs is acquired. Multiple manners may be adopted to acquire the power consumption information corresponding to the ONU in different CHs. For example, at least one of the following manners may be adopted. The power consumption information corresponding to the ONU in different CHs may be evaluated according to a current environment parameter of the ONU. Or, the power consumption information of the ONU working in different CHs under a current environment parameter may be read.

Figure 4:
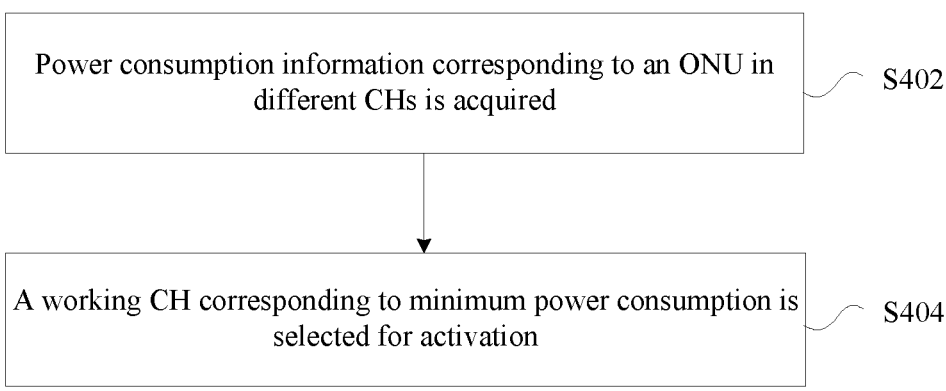
FIG. 4 is a flowchart of a second working CH tuning method according to an embodiment of the present disclosure.

FIG. 4 is a flowchart of a second working CH tuning method according to an embodiment of the present disclosure. As shown in FIG. 4, the flow may include the following acts S402 to S404.

At act S402, power consumption information corresponding to an ONU in different CHs is acquired. The power consumption information corresponding to the ONU in different CHs may include power consumption information of the ONU in different CHs under a current environment parameter. The ONU may correspond to multiple kinds of power consumption information in different CHs, for example, including at least one of: power consumption values corresponding to the ONU in different CHs or a power consumption ranking table corresponding to the ONU in different CHs.

At act S404, a working CH corresponding to minimum power consumption is selected for activation.

By the acts, the ONU selects the working CH corresponding to the minimum power consumption for activation, so that the problem in the related technology that an ONU has different power consumption when working in different OLT CTs, and enabling the ONU to work in any OLT CT may not effectively reduce the power consumption of the ONU is solved, and an effect of effectively reducing the power consumption of the ONU may be further achieved.

Multiple manners may be adopted to acquire the power consumption information corresponding to the ONU in different CHs. For example, the power consumption information corresponding to the ONU in different CHs may be acquired in at least one of the following manners. The power consumption information corresponding to the ONU in different CHs may be evaluated according to a current environment parameter of the ONU. Or, the power consumption information of the ONU working in different CHs under a current environment parameter may be read.

Figure 5:
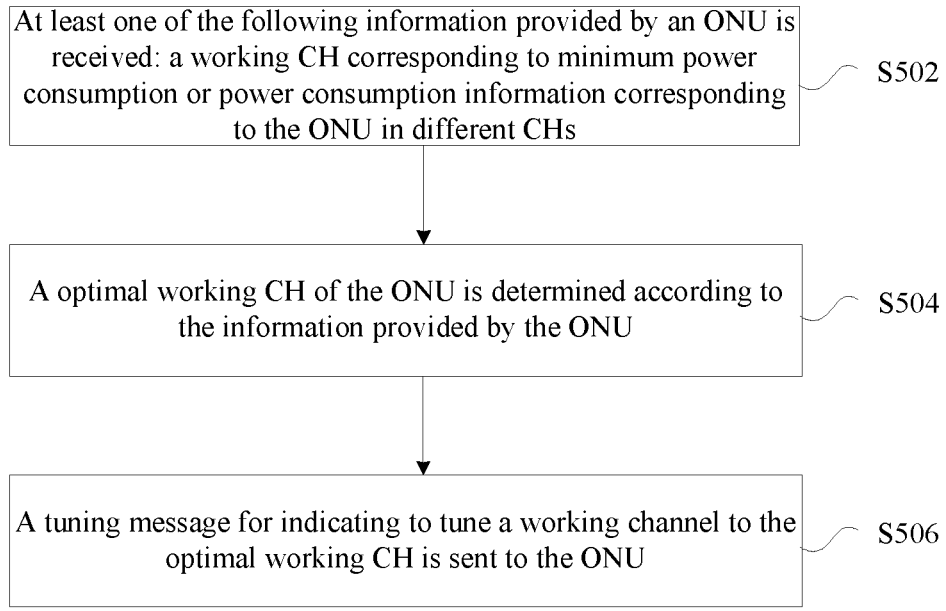
FIG. 5 is a flowchart of a third working CH tuning method according to an embodiment of the present disclosure.

FIG. 5 is a flowchart of a third working CH tuning method according to an embodiment of the present disclosure. As shown in FIG. 5, the flow may include the following acts S502 to S506.

At act S502, at least one of the following information provided by an ONU is received: a working CH corresponding to minimum power consumption or power consumption information corresponding to the ONU in different CHs. The working CH corresponding to the minimum power consumption may include a working CH corresponding to minimum power consumption of the ONU under a current environment parameter. The power consumption information corresponding to the ONU in different CHs may include power consumption information corresponding to the ONU in different CHs under a current environment parameter. The ONU may correspond to multiple forms of power consumption information in different CHs, for example, including at least one of: power consumption values corresponding to the ONU in different CHs or a power consumption ranking table corresponding to the ONU in different CHs.

At act S504, an optimal working CH of the ONU is determined according to the information provided by the ONU.

At act S506, a tuning message for indicating to tune a working channel to the optimal working CH is sent to the ONU.

By the acts, the optimal working CH of the ONU is determined according to the information provided by the ONU, and the ONU is indicated to tune to the optimal working CH, so that the problem in the related technology that an ONU has different power consumption when working in different OLT CTs, and enabling the ONU to work in any OLT CT may not effectively reduce the power consumption of the ONU is solved, and an effect of effectively reducing the power consumption of the ONU may be further achieved.

Multiple manners may be adopted to enable that the information provided by the ONU can be received. For example, the information provided by the ONU may be received in at least one of the following manners: the information provided by the ONU is received in a report from the ONU; the information provided by the ONU is received after a query is sent to the ONU by an OLT; or the information provided by the ONU is received in a manner of reading by the OLT.

In the embodiment of the present disclosure, multiple manners may be adopted to determine the optimal working CH of the ONU. For example, at least one of the following manners may be adopted. The optimal working CH may be determined to be the working CH corresponding to the minimum power consumption of the ONU. Or, the optimal working CH may be determined to be a working CH determined based on the power consumption information in different working CHs and a management factor, where the management factor may include at least one of: numbers of ONUs corresponding to different CHs, ONU bandwidth distributions of different CHs, time delays of different CHs after joining of the ONU or a working state of an OLT port.

When different management factors are considered, specific processing for determining the optimal working CH may also be different. For example, under a condition that the management factor includes at least one of the ONU bandwidth distributions of different CHs or the time delays of different CHs after joining of the ONU, the act that the optimal working CH is determined to be the working CH determined based on the power consumption information in different working CHs and the management factor may include the following acts. The working CH corresponding to the minimum power consumption is determined at first according to the power consumption information in different working CHs. Then, whether a bandwidth resource of the working CH corresponding to the minimum power consumption meets access of the ONU or not and/or whether the time delay of the working CH corresponding to the minimum power consumption after access of the ONU is smaller than a predetermined time length or not is judged. Under a condition that a judgment result is positive, the working CH corresponding to the minimum power consumption is determined as the optimal working CH, and/or under a condition that the judgment result is negative, the act of judging whether a bandwidth resource of a corresponding working CH meets access of the ONU or not and/or whether the time delay of the corresponding working CH after access of the ONU is smaller than the predetermined time length or not is repeatedly executed according to a sequence from low to high power consumption values until a judgment result is positive, and then the corresponding working CH is determined as the optimal working CH. In such a manner, when the optimal working CH is determined, due to consideration of a specific scenario of a working CH, the determined optimal working CH is more accurate. Moreover, a second optimal working CH may also be selected when working in the first optimal working CH is impossible, so that a selection manner is diversified.

Figure 6:
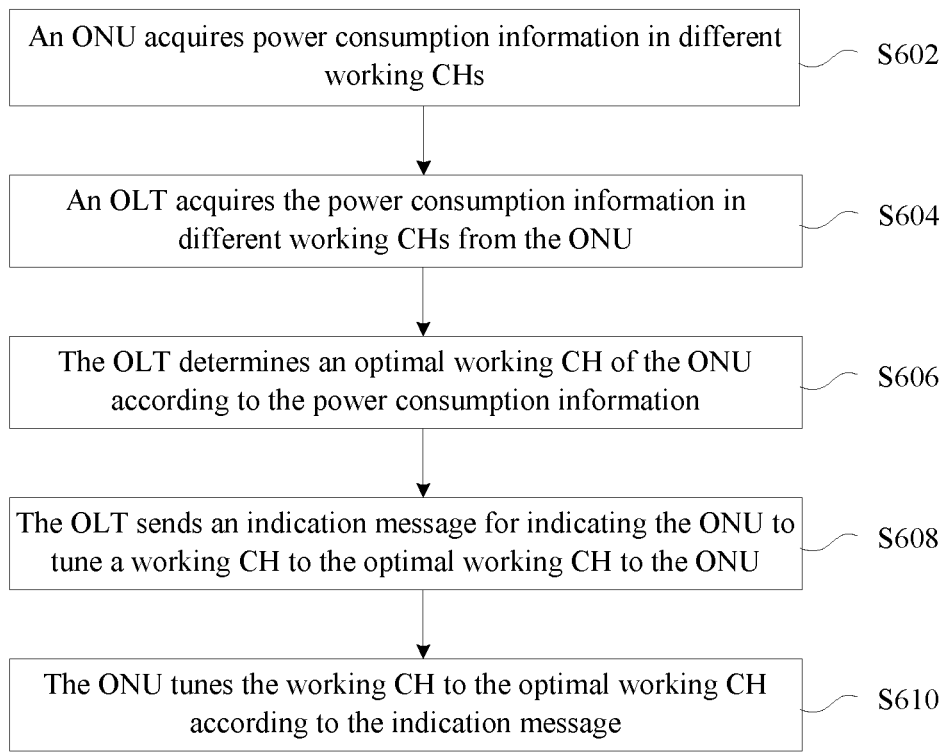
FIG. 6 is a flowchart of a fourth working CH tuning method according to an embodiment of the present disclosure.

FIG. 6 is a flowchart of a fourth working CH tuning method according to an embodiment of the present disclosure. As shown in FIG. 6, the flow may include the following acts S602 to S610.

At act S602, an ONU acquires power consumption information in different working CHs. The power consumption information corresponding to the ONU in different CHs may include power consumption information corresponding to the ONU in different CHs under a current environment parameter, and/or the power consumption information corresponding to the ONU in different CHs may include at least one of: power consumption values corresponding to the ONU in different CHs or a power consumption ranking table corresponding to the ONU in different CHs.

At act S604, an OLT acquires the power consumption information in different working CHs from the ONU.

At act S606, the OLT determines an optimal working CH of the ONU according to the power consumption information.

At act S608, the OLT sends an indication message for indicating the ONU to tune a working CH to the optimal working CH to the ONU.

At act S610, the ONU tunes the working CH to the optimal working CH according to the indication message.

By the acts, the optimal working CH of the ONU is determined according to the power consumption information, stored by the ONU, corresponding to each CH, and the ONU is indicated by the OLT to be tuned to the optimal working CH, so that the problem in the related technology that an ONU has different power consumption when working in different OLT CTs, and enabling the ONU to work in any OLT CT may not effectively reduce the power consumption of the ONU is solved, and an effect of effectively reducing the power consumption of the ONU may be further achieved.

Multiple acquisition manners may be adopted for the ONU to acquire the power consumption information in different CHs. For example, the power consumption information corresponding to the ONU in different CHs may be evaluated according to a current environment parameter of the ONU. Or, the power consumption information of the ONU working in different CHs under a current environment parameter may also be directly read. In addition, the ONU may acquire the power consumption information in different working CHs in multiple implementation manners. For example, the ONU is tuned to each CH to record the information after accessing a network. As another example, power consumption in different CHs may also be tested and stored before delivery. As still another example, an optical module of the ONU may also test the power consumption in different CHs before delivery and a main unit of the ONU measures power consumption without the optical module and performs calculation and storage. As still another example, data fitting may be further performed for prediction according to small-scale testing.

In an exemplary embodiment, the OLT may determine the optimal working CH of the ONU according to the power consumption information in multiple manners. In an exemplary embodiment, the following manner may be adopted. The OLT determines the optimal working CH of the ONU according to power consumption values and/or a power consumption ranking table corresponding to the power consumption information. Or, the OLT determines the optimal working CH according to power consumption values and/or a power consumption ranking table corresponding to the power consumption information as well as a management factor. The management factor may include: numbers of ONUs corresponding to different CHs, ONU bandwidth distributions of different CHs, time delays of different CHs after joining of the ONU or a working state of an OLT port.

In an exemplary embodiment, under a condition that the management factor may include at least one of the ONU bandwidth distributions of different CHs or the time delays of different CHs after joining of the ONU, the act that the OLT determines the optimal working CH according to power consumption values and/or a power consumption ranking table corresponding to the power consumption information as well as the management factor may include the following acts. A working CH corresponding to minimum power consumption is determined according to the power consumption information in different working CHs. Whether a bandwidth resource of the working CH corresponding to the minimum power consumption meets access of the ONU or not and/or whether the time delay of the working CH corresponding to the minimum power consumption after access of the ONU is smaller than a predetermined time length or not is judged. Under a condition that a judgment result is positive, the working CH corresponding to the minimum power consumption is determined as the optimal working CH, and/or under a condition that the judgment result is negative, the act of judging whether a bandwidth resource of a corresponding working CH meets access of the ONU or not and/or whether the time delay of the corresponding working CH after access of the ONU is smaller than the predetermined time length or not is repeatedly executed according to a sequence from low to high power consumption values until a judgment result is positive, and then the corresponding working CH is determined as the optimal working CH.

The embodiment further provides a working CH tuning device. The device is arranged to implement the abovementioned embodiments and exemplary implementation modes, and what has been described will not be elaborated. For example, term "module", used below, may be a combination of software and/or hardware capable of realizing a preset function. Although the device described in the following embodiment is preferably implemented with software, implementation with hardware or a combination of the software and the hardware is also possible and conceivable.

Figure 7:
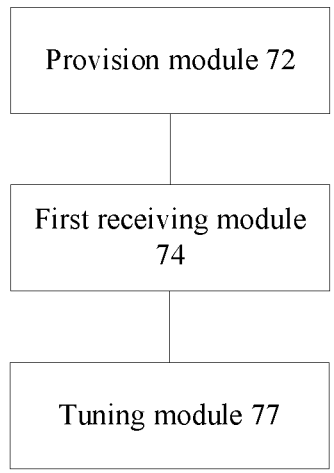
FIG. 7 is a structure block diagram of a first working CH tuning device according to an embodiment of the present disclosure.

FIG. 7 is a structure block diagram of a first working CH tuning device according to an embodiment of the present disclosure. As shown in FIG. 7, the device may include: a provision module 72, a first receiving module 74 and a tuning module 77. The device will be described below.

The provision module 72 is arranged to provide at least one of the following information for an OLT: a working CH corresponding to minimum power consumption or power consumption information corresponding to an ONU in different CHs. The first receiving module 74 is coupled to the provision module 72, and is arranged to receive a tuning message which indicates an optimal working CH and is provided by the OLT according to the provided information. The tuning module 77 is coupled to the first receiving module 74, and is arranged to tune a working CH to the optimal working CH indicated by the tuning message.

In an exemplary embodiment, the provision module 72 may be further arranged to provide the information for the OLT in a following manner: under a condition that the ONU is under a registration activation response process, the information is provided for the OLT through a Serial_Number_ONU response message responsive to registration activation; under a condition that the ONU is in a working state, the information is provided for the OLT through at least one of: a Serial_Number_ONU working message, a PLOAM message or an OMCI message.

Figure 8:
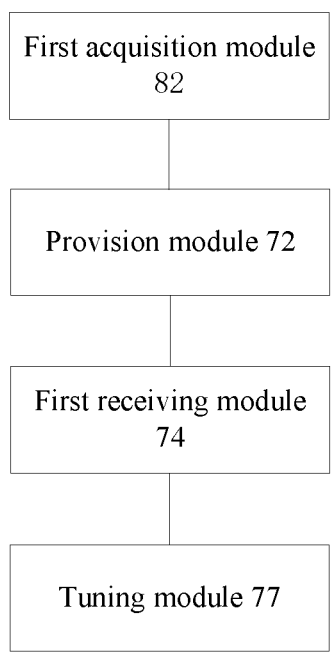
FIG. 8 is an exemplary structure block diagram of a first working CH tuning device according to an embodiment of the present disclosure.

FIG. 8 is an exemplary structure block diagram of a first working CH tuning device according to an embodiment of the present disclosure. As shown in FIG. 8, besides the structure shown in FIG. 7, the device may further include: a first acquisition module 82. The first acquisition module 82 will be described below.

The first acquisition module 82 is coupled to the provision module 72, and is arranged to acquire the power consumption information corresponding to the ONU in different CHs in at least one of the following manners: the power consumption information corresponding to the ONU in different CHs is evaluated according to a current environment parameter of the ONU; or the power consumption information of the ONU working in different CHs under a current environment parameter is read.

Figure 9:
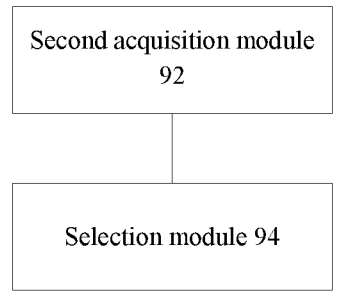
FIG. 9 is a structure block diagram of a second working CH tuning device according to an embodiment of the present disclosure.

FIG. 9 is a structure block diagram of a second working CH tuning device according to an embodiment of the present disclosure. As shown in FIG. 9, the device may include: a second acquisition module 92 and a selection module 94. The device will be described below.

The second acquisition module 92 is arranged to acquire power consumption information corresponding to an ONU in different CHs. The selection module 94 is coupled to the second acquisition module 92, and is arranged to select a working CH corresponding to minimum power consumption for activation.

In an exemplary embodiment, the second acquisition module 92 may be further arranged to acquire the power consumption information corresponding to the ONU in different CHs in at least one of the following manners: the power consumption information corresponding to the ONU in different CHs is evaluated according to a current environment parameter of the ONU; or the power consumption information of the ONU working in different CHs under a current environment parameter is read.

Figure 10:
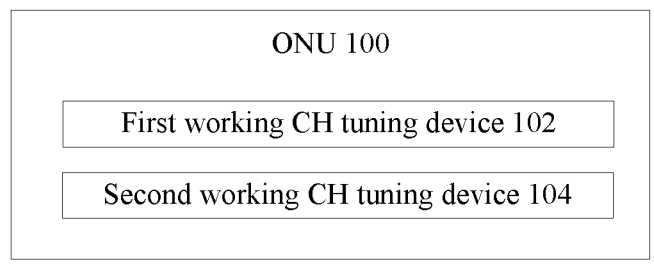
FIG. 10 is a structure block diagram of an ONU according to an embodiment of the present disclosure.

FIG. 10 is a structure block diagram of an ONU according to an embodiment of the present disclosure. As shown in FIG. 10, the ONU 100 may include the first working CH tuning device 102 and/or the second working CH tuning device 104.

Figure 11:
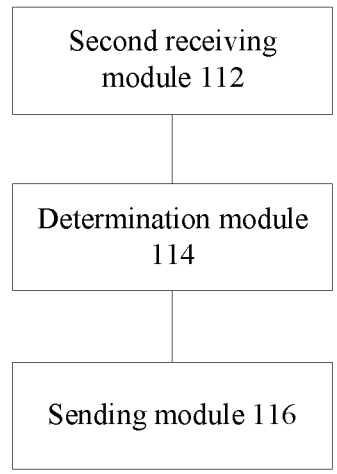
FIG. 11 is a structure block diagram of a third working CH tuning device according to an embodiment of the present disclosure.

FIG. 11 is a structure block diagram of a third working CH tuning device according to an embodiment of the present disclosure. As shown in FIG. 11, the device may include: a second receiving module 112, a determination module 114 and a sending module 116. The device will be described below.

The second receiving module 112 is arranged to receive at least one of the following information provided by an ONU: a working CH corresponding to minimum power consumption or power consumption information corresponding to the ONU in different CHs. The determination module 114 is coupled to the second receiving module 112, and is arranged to determine an optimal working CH of the ONU according to the information provided by the ONU. The sending module 116 is coupled to the determination module 114, and is arranged to send a tuning message for indicating to tune a working channel to the optimal working CH to the ONU.

In an exemplary embodiment, the second receiving module 112 may be further arranged to receive the information provided by the ONU in at least one of the following manners: the information provided by the ONU is received in a report from the ONU; the information provided by the ONU is received after a query is sent to the ONU by an OLT; or the information provided by the ONU is received in a manner of reading by the OLT.

Figure 12:
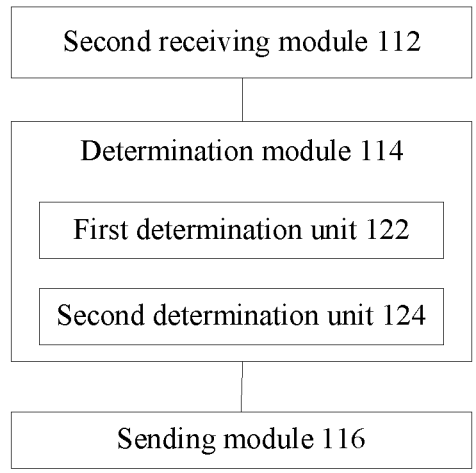
FIG. 12 is an exemplary structure block diagram of a determination module 114 in a third working CH tuning device according to an embodiment of the present disclosure.

FIG. 12 is an exemplary structure block diagram of a determination module 114 in a third working CH tuning device according to an embodiment of the present disclosure. As shown in FIG. 12, the determination module 114 may include at least one of: a first determination unit 122 and a second determination unit 124. The determination module 114 will be described below.

The first determination unit 122 is arranged to determine the optimal working CH to be the working CH corresponding to the minimum power consumption of the ONU. The second determination unit 124 is arranged to determine the optimal working CH to be a working CH determined based on the power consumption information in different working CHs and a management factor, where the management factor may include at least one of: numbers of ONUs corresponding to different CHs, ONU bandwidth distributions of different CHs, time delays of different CHs after joining of the ONU or a working state of an OLT port.

Figure 13:
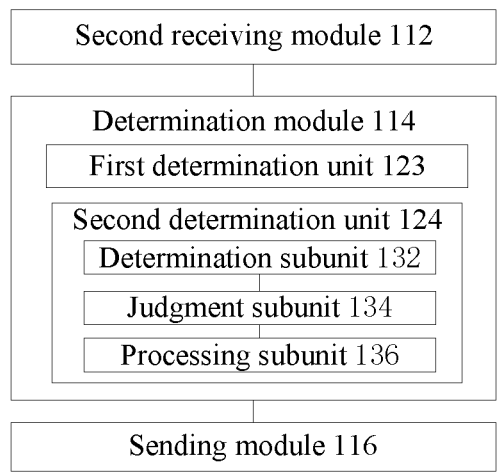
FIG. 13 is an exemplary structure block diagram of a second determination unit 124 in a determination module 114 in a third working CH tuning device according to an embodiment of the present disclosure.

FIG. 13 is an exemplary structure block diagram of a second determination unit 124 in a determination module 114 in a third working CH tuning device according to an embodiment of the present disclosure. As shown in FIG. 13, the second determination unit 124 may include: a determination subunit 132, a judgment subunit 134 and a processing subunit 136. The second determination unit 124 will be described below.

The determination subunit 132 is arranged to, under a condition that the management factor may include at least one of the ONU bandwidth distributions of different CHs or the time delays of different CHs after joining of the ONU, determine a working CH corresponding to minimum power consumption according to the power consumption information in different working CHs. The judgment subunit 134 is coupled to the determination subunit 132, and is arranged to judge whether a bandwidth resource of the working CH corresponding to the minimum power consumption meets access of the ONU or not and/or whether the time delay of the working CH corresponding to the minimum power consumption after access of the ONU is smaller than a predetermined time length or not. The processing subunit 136 is coupled to the judgment subunit 134, and is arranged to, under a condition that a judgment result is positive, determine a working CH corresponding to minimum power consumption is determined as the optimal working CH, and/or under a condition that the judgment result is negative, repeatedly execute the act of judging whether a bandwidth resource of a corresponding working CH meets access of the ONU or not and/or whether the time delay of the corresponding working CH after access of the ONU is smaller than the predetermined time length or not according to a sequence from low to high power consumption values until a judgment result is positive, and then determine the corresponding working CH as the optimal working CH.

Figure 14:
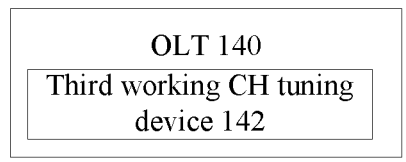
FIG. 14 is a structure block diagram of an OLT according to an embodiment of the present disclosure.

FIG. 14 is a structure block diagram of an OLT according to an embodiment of the present disclosure. As shown in FIG. 14, the OLT 130 may include any abovementioned third working CH tuning device 142.

Figure 15:
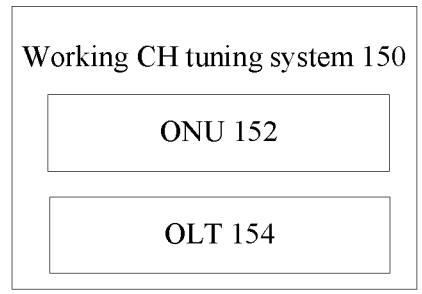
FIG. 15 is a structure diagram of a working CH tuning system according to an embodiment of the present disclosure.

FIG. 15 is a structure diagram of a working CH tuning system according to an embodiment of the present disclosure. As shown in FIG. 15, the working CH tuning system 150 may include an ONU 152 and an OLT 154, which will be described below respectively.

The ONU 152 is arranged to acquire power consumption information in different working CHs. The OLT 154 is arranged to acquire the power consumption information in different working CHs from the ONU. The OLT 154 may be further arranged to determine an optimal working CH of the ONU according to the power consumption information, and send an indication message for indicating the ONU to tune a working CH to the optimal working CH to the ONU. The ONU 152 may be further arranged to tune the working CH to the optimal working CH according to the indication message.

In an exemplary embodiment, the ONU may be further arranged to acquire the power consumption information in different working CHs in at least one of the following manners: the power consumption information corresponding to the ONU in different CHs is evaluated according to a current environment parameter of the ONU; or the power consumption information of the ONU working in different CHs under a current environment parameter is read.

In an exemplary embodiment, the OLT 154 may be further arranged to determine the optimal working CH of the ONU according to power consumption values and/or a power consumption ranking table corresponding to the power consumption information. Or, the OLT 154 may be further arranged to determine the optimal working CH according to power consumption values and/or a power consumption ranking table corresponding to the power consumption information as well as a management factor, where the management factor may include: numbers of ONUs corresponding to different CHs, ONU bandwidth distributions of different CHs, time delays of different CHs after joining of the ONU or a working state of an OLT port.

In an exemplary embodiment, the OLT may be further arranged to, under a condition that the management factor may include at least one of the ONU bandwidth distributions of different CHs or the time delays of different CHs after joining of the ONU, determine the optimal working CH according to power consumption values and/or a power consumption ranking table corresponding to the power consumption information as well as the management factor in a following manner. The working CH corresponding to minimum power consumption is determined according to the power consumption information in different working CHs. Whether a bandwidth resource of the working CH corresponding to the minimum power consumption meets access of the ONU or not and/or whether the time delay of the working CH corresponding to the minimum power consumption after access of the ONU is smaller than a predetermined time length or not is judged. Under a condition that a judgment result is positive, the working CH corresponding to the minimum power consumption is determined as the optimal working CH, and/or under a condition that the judgment result is negative, the act of judging whether a bandwidth resource of a corresponding working CH meets access of the ONU or not and/or whether the time delay of the corresponding working CH after access of the ONU is smaller than the predetermined time length or not is repeatedly executed according to a sequence from low to high power consumption values until a judgment result is positive, and then the corresponding working CH is determined as the optimal working CH.

For the problem in the related technology, working temperature of an ONU may usually be set to be −40~70 degrees centigrade to meet different application environments. The ONU has the following two characteristics.

The first is that the ONU may have different control parameters (current, voltage and the like) to cause changes in power consumption according to different external environmental temperature if keeping working in a certain determined wavelength CH under different external application environmental temperature conditions. The second is that changes in the control parameters may also cause differences in power consumption when the ONU works in different wavelength CHs under the same external application environmental temperature condition.

Figure 16:
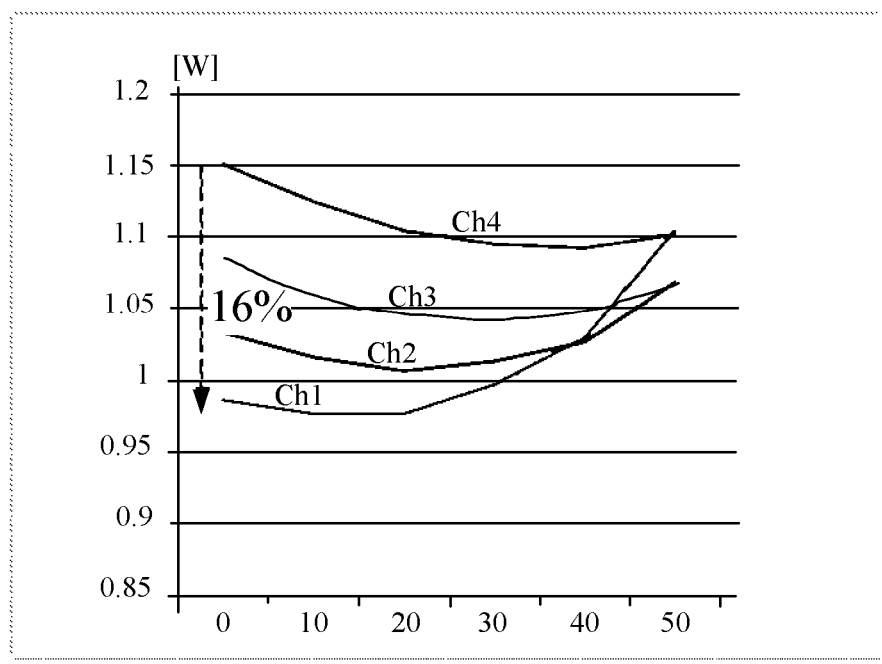
FIG. 16 is a schematic diagram of generation of different power consumption during working in different CHs according to an embodiment of the present disclosure.

In addition, in devices of different manufacturers and batches, different devices have different power consumption under the same external application environment and the same working wavelength, but a T-Tx or T-Rx in each ONU may learn about a CH corresponding to optimal power consumption through own parameter. FIG. 16 is a schematic diagram of generation of different power consumption during working in different CHs according to an embodiment of the present disclosure. As shown in FIG. 16, experimental data shows that tuning a working channel to different CHs causes a power consumption difference capable of reaching 16% under given environmental temperature.

Based on the above analysis, an embodiment provides an ONU working scheduling method. By the method, an ONU may be helped to achieve lower power consumption during working. The method will be described below.

At act 1, the ONU has at least one of the following information: (1) a working environment parameter; (2) related power consumption data corresponding to the current working environment parameter; (3) a working CH (CHx) corresponding to minimum power consumption under the current working environment parameter; and (4) power consumption ranking information of all CHs under the current working environment parameter.

At act 2, the ONU reports at least one of (2)-(4) and/or (1) in the information in act 1 (mainly to let an OLT know about power consumption information under the current working parameter); or, the OLT acquires at least one of (2)-(4) and/or (1) in the information in act 1 by querying.

At act 3, the OLT determines an optimal working CH (CHx) of the ONU based on the information acquired in act 2 and/or a user arrangement condition of each CH (for example, whether a bandwidth resource is enough or not, or whether a time delay index after joining of the ONU is proper or not).

At act 4, the ONU is indicated to tune to the corresponding CH (CHx).

Exemplary implementation modes of the present disclosure will be described below.

It may be appreciated that there is such a network environment in all of the following exemplary implementation modes that a PON system has N wavelength CHs CH1-CHN and an ONU may work in any CH by tuning its own T-Tx and T-Rx.

First exemplary embodiment: (evaluation in a registration activation process, controlled transfer)

At act 1, an ONU evaluates power consumption values during working in different CHs to obtain working CH information CHx corresponding to minimum power consumption according to current environment temperature and its inner wavelength tuning parameter.

At act 2, if a CH which the ONU is in when entering an O2-3 state is not CHx, the CHx information is included in a Serial_Number_ONU message sent in responsive to registration activation window information (Serial Number Grant) (shown in Table 1).

TABLE 1

| Octet | Content |
| --- | --- |
| 1-2 | ONU identifier |
| 3 | Message type Serial_Number_ONU |
| 4 | Serial number |
| 5~x | $CH_X$ |
| x + 1~40 | Reserved bit (or supplemented with 0) |
| 41~48 | Message integrity checking |

At act 3, an OLT indicates the ONU to tune to CHx after receiving the Serial_Number_ONU message including the CHx information (shown in Table 2).

TABLE 2

| Octet | Content |
| --- | --- |
| 1-2 | ONU identifier |
| 3 | Message type Wavelength Adjust Request |
| 4 | Serial number |
| 5~x | Indicating a target wavelength channel $CH_X$ to which the ONU is tuned |
| x + 1~40 | Reserved bit (or supplemented with 0) |
| 41~48 | Message integrity checking |

At act 5, after receiving an instruction of the OLT, the ONU continues a subsequent activation process after tuning to CHx according to a requirement.

Second exemplary embodiment: (registration activation after initial evaluation selection)

At act 1, an ONU receives information of all CHs in an O1 state.

At act 2, the ONU evaluates power consumption values during working in different CHs to obtain working CH information CHx corresponding to minimum power consumption according to current environment temperature and its inner wavelength tuning parameter.

At act 3, the ONU tunes its wavelength channel to CHx.

At act 4, the ONU continues a subsequent registration activation process.

Third exemplary embodiment: (evaluation after entering a working state and then reporting and controlled transfer)

At act 1, an ONU in an O5 running state evaluates power consumption values during working in different CHs to obtain working CH information CHx corresponding to minimum power consumption according to current environment temperature and its inner wavelength tuning parameter.

At act 2, the ONU reports CHx through a message (shown in Table 3).

TABLE 3

| Octet | Content |
| --- | --- |
| 1-2 | ONU identifier |
| 3 | Message type Serial_Number_ONU |
| 4 | Serial number |
| 5~x | $CH_X$ |
| x + 1~40 | Reserved bit (or supplemented with 0) |
| 41~48 | Message integrity checking |

At act 3, an OLT tunes the ONU to CHx by a wavelength tuning process after receiving the message including the CHx information.

The present message only serves as an example. A reporting manner in act 2 may also adopt a PLOAM message or an OMCI message, or an indicating bit of frame header overhead or the like.

Fourth exemplary embodiment: (evaluation after entering a working state, querying by an OLT and then controlled transfer)

At act 1, an ONU evaluates power consumption values in different CHs to obtain working CH information CHx corresponding to minimum power consumption according to current environment temperature and its inner wavelength tuning parameter.

At act 2, the OLT queries specific information of power consumption in the CHs and/or an evaluation result, obtained in act 1, of the ONU.

At act 3, the OLT tunes the ONU to the CH (CHx) corresponding to the minimum power consumption by a wavelength tuning process according to the information queried in act 2.

In addition, in the examples of each embodiment, the evaluation result may not only be the CHx corresponding to the minimum power consumption but also be power consumption ranking information of all the CHs in the current working environment, and the OLT may flexibly arrange the working channel of the ONU according to the acquired ranking information in combination with a bandwidth arrangement condition of all the CHs.

Fifth exemplary embodiment: (evaluation in a registration activation process and controlled transfer)

At act 1, an ONU evaluates power consumption values during working in different CHs to obtain power consumption ranking information of all CHs in a current working environment according to current environment temperature and its inner wavelength tuning parameter.

At act 2, a Serial_Number_ONU message sent when registration activation window information (Serial Number Grant) is responded may include the power consumption ranking information of all the CHs in the current working environment (shown in Table 4).

TABLE 4

| Octet | Content |
| --- | --- |
| 1-2 | ONU identifier |
| 3 | Message type Serial_Number_ONU |
| 4 | Serial number |
| 5~x | Power consumption ranking information of the CHs in the current working environment |
| x + 1~40 | Reserved bit (or supplemented with 0) |
| 41~48 | Message integrity checking |

At act 4, after receiving the Serial_Number_ONU message including the power consumption ranking information of the CHs in the current working environment, an OLT indicates the ONU to tune to CHx in combination with a bandwidth arrangement condition of all the CHs (shown in Table 5).

TABLE 5

| Octet | Content |
| --- | --- |
| 1-2 | ONU identifier |
| 3 | Message type Wavelength Adjust Request |
| 4 | Serial number |
| 5~x | Indicating a target wavelength channel $CH_X$ to which the ONU is tuned |
| x + 1~40 | Reserved bit (or supplemented with 0) |
| 41~48 | Message integrity checking |

At act 5, after receiving an instruction of the OLT, the ONU continues a subsequent activation process after tuning to CHx according to a requirement.

Sixth exemplary embodiment: (no constraints of a state machine, and controlled transfer)

At act 1, an ONU stores current environment data (such as temperature and humidity) and power consumption values during working in different CHs under a current environment condition.

At act 2, an OLT reads the data stored by the ONU in act 1 through a management CH (which may be an OMCI or a PLOAM).

At act 3, the OLT determines an optimal working channel CHx of the ONU according to the data read in act 2 in combination with a user arrangement condition of each CH (for example, whether a bandwidth resource is enough or not, or whether a time delay index after joining of the ONU is proper or not).

At act 4, the OLT indicates the ONU to tune to CHx (shown in Table 6).

TABLE 6

| Octet | Content |
| --- | --- |
| 1-2 | ONU identifier |
| 3 | Message type Wavelength Adjust Request |
| 4 | Serial number |
| 5~x | Indicating a target wavelength channel $CH_X$ to which the ONU is tuned |
| x + 1~40 | Reserved bit (or supplemented with 0) |
| 41~48 | Message integrity checking |

At act 5, after receiving an instruction of the OLT, the ONU tunes to CHx according to a requirement.

Obviously, those skilled in the art should know that each module or each act of the embodiments of the present disclosure may be implemented by a universal computing device, and the modules or acts may be concentrated on a single computing device or distributed on a network formed by a plurality of computing devices, and may optionally be implemented by program codes executable for the computing devices, so that the modules or acts may be stored in a storage device for execution with the computing devices, the shown or described acts may be executed in sequences different from those described here in some circumstances, or may form each integrated circuit module respectively, or multiple modules or acts therein may form a single integrated circuit module for implementation. As a consequence, the present disclosure is not limited to any specific hardware and software combination.

The above is only the exemplary embodiments of the present disclosure and not intended to limit the present disclosure. For those skilled in the art, the present disclosure may have various modifications and variations. Any modifications, equivalent replacements, improvements and the like made within the principle of the present disclosure shall fall within the scope of protection defined by the appended claims of the present disclosure.

INDUSTRIAL APPLICABILITY

As mentioned above, by the embodiments and the exemplary implementation modes, the problem in the related technology that an ONU has different power consumption when working in different OLT CTs, and enabling the ONU to work in any OLT CT may not effectively reduce the power consumption of the ONU is solved, and an effect of effectively reducing the power consumption of the ONU may be further achieved.

What is claimed is:

1. A working Channel (CH) tuning method, comprising: providing, for an Optical Line Terminal (OLT), at least one of the following information: a working CH corresponding to minimum power consumption or power consumption information corresponding to an Optical Network Unit (ONU) in different CHs; receiving a tuning message which indicates an optimal working CH and is provided by the OLT according to the provided information; and tuning a working CH to the optimal working CH indicated by the tuning message;

or,
  acquiring power consumption information corresponding to an Optical Network Unit (ONU) in different CHs; and selecting a working CH corresponding to minimum power consumption for activation;
  wherein in a process of providing the information for the OLT, the information is provided for the OLT in a following manner: under a condition that the ONU is under a registration activation response process, the information is provided for the OLT through a Serial_Number_ONU response message responsive to registration activation; under a condition that the ONU is in a working state, the information is provided for the OLT through at least one of: a Serial_Number_ONU working message, a Physical Layer Operation Administration and Maintenance (PLOAM) message or an ONU Management Control Interface (OMCI) message.

2. The method as claimed in claim 1, wherein the working CH corresponding to the minimum power consumption comprises a working CH corresponding to minimum power consumption of the ONU under a current environment parameter; and/or the power consumption information corresponding to the ONU in different CHs comprises power consumption information corresponding to the ONU in different CHs under a current environment parameter.

3. The method as claimed in claim 1, wherein the power consumption information corresponding to the ONU in different CHs comprises at least one of: power consumption values corresponding to the ONU in different CHs or a power consumption ranking table corresponding to the ONU in different CHs.

4. The method as claimed in claim 1, before providing the information for the OLT, further comprising: acquiring the power consumption information corresponding to the ONU in different CHs in at least one of the following manners:
  the power consumption information corresponding to the ONU in different CHs is evaluated according to a current environment parameter of the ONU; or
  the power consumption information of the ONU working in different CHs under a current environment parameter is read.

5. A working Channel (CH) tuning method, comprising:
  receiving at least one of the following information provided by an Optical Network Unit (ONU): a working CH corresponding to minimum power consumption or power consumption information corresponding to the ONU in different CHs;
  determining an optimal working CH of the ONU according to the information provided by the ONU; and
  sending a tuning message for indicating to tune a working channel to the optimal working CH to the ONU;
  wherein the information provided by the ONU is received in at least one of the following manners: the information provided by the ONU is received in a report from the ONU; the information provided by the ONU is received after a query is sent to the ONU by an OLT; or the information provided by the ONU is received in a manner of reading by the OLT.

6. The method as claimed in claim 5, wherein the working CH corresponding to the minimum power consumption comprises a working CH corresponding to minimum power consumption of the ONU under a current environment parameter; and/or the power consumption information corresponding to the ONU in different CHs comprises power consumption information corresponding to the ONU in different CHs under a current environment parameter.

7. The method as claimed in claim 5, wherein the power consumption information corresponding to the ONU in different CHs comprises at least one of: power consumption values corresponding to the ONU in different CHs or a power consumption ranking table corresponding to the ONU in different CHs.

8. The method as claimed in claim 5, wherein determining the optimal working CH of the ONU comprises at least one of:
  determining the optimal working CH to be the working CH corresponding to the minimum power consumption of the ONU; or
  determining the optimal working CH to be a working CH determined based on the power consumption information in different working CHs and a management factor, wherein the management factor comprises at least one of: numbers of ONUs corresponding to different CHs, ONU bandwidth distributions of different CHs, time delays of different CHs after joining of the ONU or a working state of an OLT port.

9. The method as claimed in claim 8, wherein, under a condition that the management factor comprises at least one of the ONU bandwidth distributions of different CHs or the time delays of different CHs after joining of the ONU, determining the optimal working CH to be the working CH determined based on the power consumption information in different working CHs and the management factor comprises:
  determining a working CH corresponding to minimum power consumption according to the power consumption information in different working CHs;
  judging whether a bandwidth resource of the working CH corresponding to the minimum power consumption meets access of the ONU or not and/or whether the time delay of the working CH corresponding to the minimum power consumption after access of the ONU is smaller than a predetermined time length or not; and
  under a condition that a judgment result is positive, determining the working CH corresponding to the minimum power consumption as the optimal working CH, and/or under a condition that the judgment result is negative, repeatedly executing the act of judging whether a bandwidth resource of a corresponding working CH meets access of the ONU or not and/or whether the time delay of the corresponding working CH after access of the ONU is smaller than the predetermined time length or not according to a sequence from low to high power consumption values until a judgment result is positive, and then determining the corresponding working CH as the optimal working CH.

10. A working Channel (CH) tuning device, comprising a hardware processor arranged to execute program modules comprising:
  a provision module, arranged to provide, for an Optical Line Terminal (OLT), at least one of the following information: a working CH corresponding to minimum power consumption or power consumption information corresponding to an Optical Network Unit (ONU) in different CHs; a first receiving module, arranged to receive a tuning message which indicates an optimal working CH and is provided by the OLT according to the provided information; and a tuning module, arranged to tune a working CH to the optimal working CH indicated by the tuning message;
  or, comprising a hardware processor arranged to execute program modules comprising:

a second acquisition module, arranged to acquire power consumption information corresponding to an Optical Network Unit (ONU) in different CHs; and a selection module, arranged to select a working CH corresponding to minimum power consumption for activation;

wherein the provision module is further arranged to provide the information for the OLT in a following manner: under a condition that the ONU is under a registration activation response process, the information is provided for the OLT through a Serial_Number_ONU response message responsive to registration activation; under a condition that the ONU is in a working state, the information is provided for the OLT through at least one of: a Serial_Number_ONU working message, a Physical Layer Operation Administration and Maintenance (PLOAM) message or an ONU Management Control Interface (OMCI) message.

11. The device as claimed in claim 10, wherein the hardware processor is arranged to execute program modules further comprising: a first acquisition module, arranged to acquire the power consumption information corresponding to the ONU in different CHs in at least one of the following manners:

the power consumption information corresponding to the ONU in different CHs is evaluated according to a current environment parameter of the ONU; or the power consumption information of the ONU working in different CHs under a current environment parameter is read.

12. A working Channel (CH) tuning device, comprising a hardware processor arranged to execute program modules comprising:

a second receiving module, arranged to receive at least one of the following information provided by an Optical Network Unit (ONU): a working CH corresponding to minimum power consumption or power consumption information corresponding to the ONU in different CHs;

a determination module, arranged to determine an optimal working CH of the ONU according to the information provided by the ONU; and a sending module, arranged to send a tuning message for indicating to tune a working channel to the optimal working CH to the ONU;

wherein the second receiving module is further arranged to receive the information provided by the ONU in at least one of the following manners: the information provided by the ONU is received in a report from the ONU; the information provided by the ONU is received after a query is sent to the ONU by an Optical Line Terminal (OLT); or the information provided by the ONU is received in a manner of reading by the OLT.

13. The device as claimed in claim 12, wherein the determination module comprises at least one of:

a first determination unit, arranged to determine the optimal working CH to be the working CH corresponding to the minimum power consumption of the ONU; and a second determination unit, arranged to determine the optimal working CH to be a working CH determined based on the power consumption information in different working CHs and a management factor, wherein the management factor comprises at least one of: numbers of ONUs corresponding to different CHs, ONU bandwidth distributions of different CHs, time delays of different CHs after joining of the ONU or a working state of an OLT port.

14. The device as claimed in claim 13, wherein the second determination unit comprises:

a determination subunit, arranged to, under a condition that the management factor comprises at least one of the ONU bandwidth distributions of different CHs or the time delays of different CHs after joining of the ONU, determine a working CH corresponding to minimum power consumption according to the power consumption information in different working CHs;

a judgment subunit, arranged to judge whether a bandwidth resource of the working CH corresponding to the minimum power consumption meets access of the ONU or not and/or whether the time delay of the working CH corresponding to the minimum power consumption after access of the ONU is smaller than a predetermined time length or not; and a processing subunit, arranged to, under a condition that a judgment result is positive, determine the working CH corresponding to the minimum power consumption as the optimal working CH, and/or under a condition that the judgment result is negative, repeatedly execute the act of judging whether a bandwidth resource of a corresponding working CH meets access of the ONU or not and/or whether the time delay of the corresponding working CH after access of the ONU is smaller than the predetermined time length or not according to a sequence from low to high power consumption values until a judgment result is positive, and then determine the corresponding working CH as the optimal working CH.

15. A working Channel (CH) tuning system, comprising:
an Optical Network Unit (ONU) and an Optical Line Terminal (OLT), wherein
the ONU is arranged to acquire power consumption information in different working CHs;
the OLT is arranged to acquire the power consumption information in different working CHs from the ONU;
the OLT is further arranged to determine an optimal working CH of the ONU according to the power consumption information;
the OLT is further arranged to send an indication message for indicating the ONU to tune a working CH to the optimal working CH to the ONU; and
the ONU is further arranged to tune the working CH to the optimal working CH according to the indication message;
wherein the OLT is further arranged to, under a condition that the management factor comprises at least one of the ONU bandwidth distributions of different CHs or the time delays of different CHs after joining of the ONU, determine the optimal working CH according to power consumption values and/or a power consumption ranking table corresponding to the power consumption information as well as the management factor in a following manner: the working CH corresponding to minimum power consumption is determined according to the power consumption information in different working CHs; whether a bandwidth resource of the working CH corresponding to the minimum power consumption meets access of the ONU or not and/or whether the time delay of the working CH corresponding to the minimum power consumption after access of the ONU is smaller than a predetermined time length or not is judged; and under a condition that a judgment result is positive, the working CH corresponding to the minimum power consumption is determined as the optimal working CH, and/or under a condition that the judgment result is negative, the act of judging whether a bandwidth resource of a corresponding working CH meets access of the ONU or not and/or whether the time delay of the corresponding working CH after access of the ONU is smaller than the predetermined time length or not is repeatedly executed according to a sequence from low to high power consumption values until a judgment result is positive, and then the corresponding working CH is determined as the optimal working CH.

16. The system as claimed in claim 15, wherein the ONU is further arranged to acquire the power consumption information in different working CHs in at least one of the following manners:

the power consumption information corresponding to the ONU in different CHs is evaluated according to a current environment parameter of the ONU; or the power consumption information of the ONU working in different CHs under a current environment parameter is read.

17. The system as claimed in claim 15, wherein the OLT is further arranged to determine the optimal working CH of the ONU according to power consumption values and/or a power consumption ranking table corresponding to the power consumption information; or the OLT is further arranged to determine the optimal working CH according to power consumption values and/or a power consumption ranking table corresponding to the power consumption information as well as a management factor, wherein the management factor comprises: numbers of ONUs corresponding to different CHs, ONU bandwidth distributions of different CHs, time delays of different CHs after joining of the ONU or a working state of an OLT port.

* * * * *